United States Patent [19]

Watts et al.

[11] Patent Number: 4,872,337
[45] Date of Patent: Oct. 10, 1989

[54] NONDESTRUCTIVE TESTING OF GEARS

[76] Inventors: Robert J. Watts, 22430 St. Clair Dr., St. Clair Shores, Macomb, Mich. 48081; David A. Rice, 25 Village View Bluff, Ballston Lake, Saratoga, N.Y. 12019; John A. Neun, 80 St. Andrews Dr., Clifton Park, Saratoga, N.Y. 12065

[21] Appl. No.: 150,114

[22] Filed: Jan. 29, 1988

[51] Int. Cl.$^4$ ............... G01M 13/02; G06F 07/02
[52] U.S. Cl. .................. 73/162; 364/424.1; 364/575
[58] Field of Search ............ 73/162, 593; 364/575, 364/424.1; 74/856

[56] References Cited

U.S. PATENT DOCUMENTS

| | | | |
|---|---|---|---|
| 3,127,767 | 4/1964 | Kamp | 73/162 |
| 3,580,068 | 5/1971 | Hoodwin | 73/162 |
| 3,712,130 | 1/1973 | Weichbrodt et al. | 73/162 |
| 4,123,166 | 10/1978 | Botcherhy et al. | 73/657 X |
| 4,305,132 | 12/1981 | Tsuboshima et al. | 364/575 X |
| 4,380,048 | 4/1983 | Kishi et al. | 364/424.1 |
| 4,649,743 | 3/1987 | Sugimoto et al. | 73/162 |
| 4,684,922 | 8/1987 | Minogue | 364/575 X |

FOREIGN PATENT DOCUMENTS 2850938  5/1979  Fed. Rep. of Germany ........ 73/162

OTHER PUBLICATIONS

"Laser Vibration Depot Inspection of Gear Boxes", SAE Paper No. 870,400, Feb. 23-27, 1987, Robert J. Watts et al., 16 pages.

Primary Examiner—Daniel M. Yasich

[57] ABSTRACT

A gear evaluation system which includes means for measuring gear rotational speed and gear case vibrational displacement associated with gear mesh action. A signal is displacement associated with gear mesh action. A signal is developed that represents the time series average signal synchronized to the relevant gear shaft speed. This signal is passed through a bandpass filter set to pass a signal at the gear mesh frequency (for the particular gear under evaluation). After rectification the output signal provides information relating to average vibrational levels associated with gear mesh action and deviations from the average levels.

4 Claims, 3 Drawing Sheets

NONDESTRUCTIVE TESTING OF GEARS

GOVERNMENT INTEREST

The invention described herein may be manufactured, used, and licensed by or for the Government for governmental purposes without payment to us of any royalty thereon.

BACKGROUND AND SUMMARY OF THE INVENTION

This invention relates to a mechanism for nondestructively testing a gear type transmission. The mechanism comprises a vibration measuring device (e.g., a laser type sensor) positioned outside the gear case to measure the amplitude of vibrations induced in the gear case by unsatisfactory gear mesh actions. The mechanism further comprises speed measurement devices (e.g., tachometers) for measuring the rotational motion (r.p.m) of the shafts on which the gears are carried.

Both the vibration measuring device and the speed measuring devices are located outside the gear case. There is no need to dismantle the gear assembly, or to install the measuring devices within the gear case.

The proposed measuring system is somewhat similar to a measuring system disclosed in a paper prepared by Richard G. DeJong and Jerome E. Manning titled "Gear Noise Analysis Using Modern Signal Processing and Numerical Modeling Techniques", published by the Society of Automotive Engineers (SAE), paper No. 840478. Another system of interest is disclosed in an article by S.L. Shmater titled "Precision Measurement of Torsional Oscillations Induced by Gear Errors" on pp. 77 through 88 of a publication titled "The Shock and Vibration Bulletin" for June 1984, published by the Shock and Vibration Information Center, Naval Research Laboratory, Washington, D.C. U.S. Pat. No. 4,649,743 discloses another system for non-destructively testing gear type transmissions.

The proposed system differs from the above-referenced testing systems in regard to the parameters used for designating a gear fault. In the prepared system the time series averaged signal, synchronized to the relevant shaft speed, and variations thereof, are used to measure gear acceptability.

THE DRAWINGS

Figure 7:
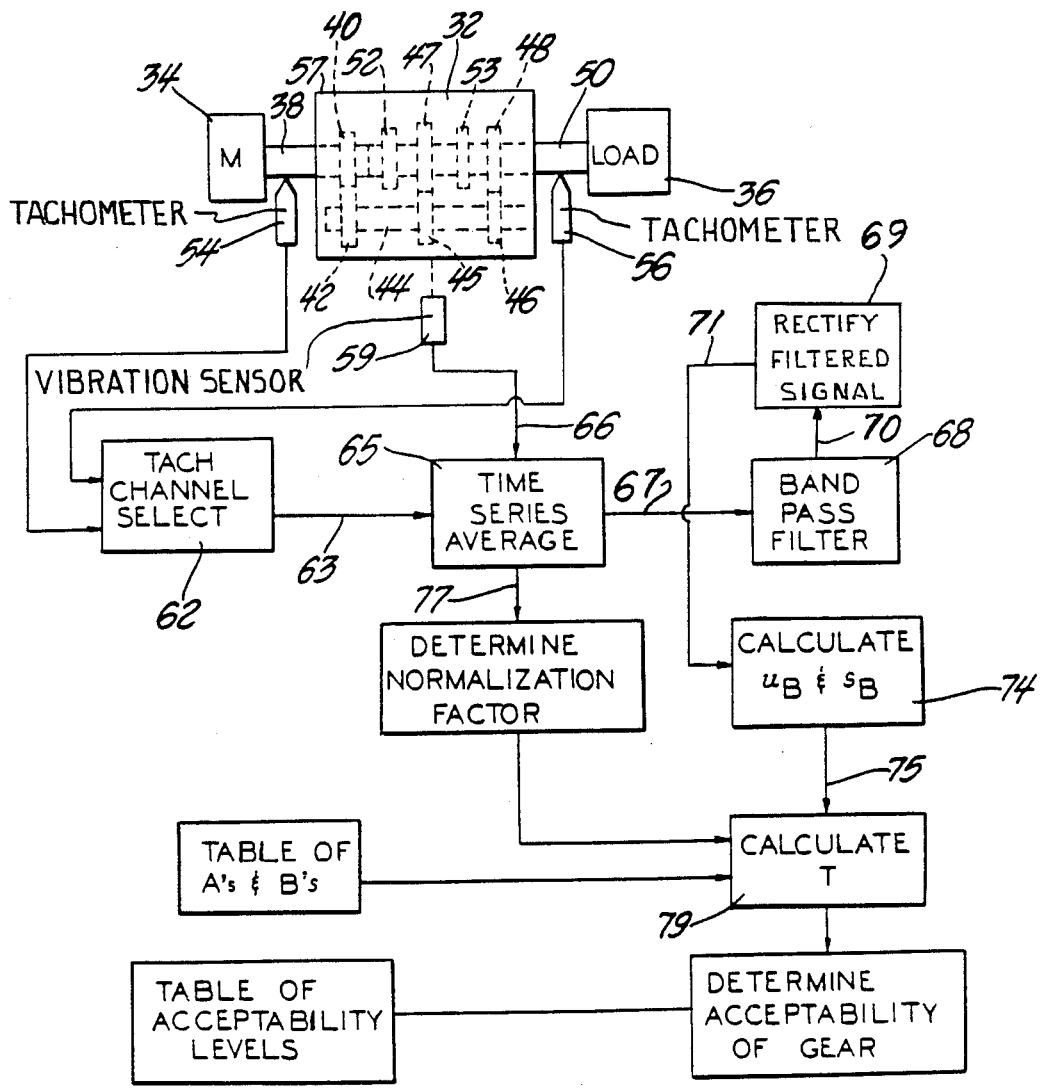

FIG. 7 schematically illustrates one form of gear evaluation system that our invention can take.

DESCRIPTION OF THE INVENTION

The invention is based on an assessment of gear condition based on vibration level of a transmission gear case. Two measured data are required: vibration level, measured with a vibration sensor (i.e., an accelerometer, velocimeter, or displacement probe), and gear (shaft) speed, measured with a tachometer.

A times series average is calculated based on vibration data and appropriate synchronization data, such that only vibration of the shaft causing the synchronization signal is left in the vibration signal after averaging. If the appropriate synchronization signal is not accessible, it can be synthesized using any shaft in the gear train.

The time series averaged signal is passed through a band pass filter such that only vibration at the gear mesh frequency of the subject gear is passed through the filter.

A normalizing factor, N, is determined. This factor is regarded as the quality of accuracy with which individual gear vibrations are transferred to the gear box of the transmission.

The gear pass/fail index T can be calculated using the following equation, hereinafter referred as equation 1:

$$T = [A_1(u_{B1}/N) + B_1(s_{B1}/u_{B1})] + [A_2(u_{B2}/N) + B_2(s_{B2}/u_{B2})] + [A_3(u_{B3}/N) + B_3(s_{B3}/u_{B3})] + \ldots + [A_n(u_{Bn}/N) + B_n(s_{Bn}/u_{Bn})]$$

where:

(a) T is the gear fault characterization parameter. This T can be compared to an empirically selected standard to determine whether the tested gear is acceptable.

(b) The first bracketed expression on the right side of the equation pertains to the first harmonic of the vibration of the tested gear, the second bracketed expression pertains to the second harmonic of this vibration, the third bracketed expression pertains to the third harmonic of this vibration, and the nth bracketed expression pertains to the nth harmonic of this vibration.

(c) Each of the "$U_B$", variables ($U_{B1}$, $U_{B2}$, $U_{B3}$ ... $U_{Bn}$) is the average of the absolute value of the band-passed, time-series averaged data for a given harmonic of the vibration for the tested gear.

(d) Each of the "$S_B$" variables ($S_{B1}$, $S_{B2}$, $S_{B3}$ ... $S_{Bn}$) is the standard deviation of the absolute value of the band-passed, time-series-averaged data.

(e) Each of the variously subscripted A and B values are empirical weighting factors for corresponding $U_B$ and $s_B$ factors.

(f) N is the normalization factor, which is constant for each harmonic of every tested gear within the same transmission. A separate N is derived for each transmission.

DERIVATION OF THE A, B, AND N VARIABLES

By empirical testing, it has been determined that each of the A and B values is a function of four subvariables:

(1) gear ratio between meshed gears
(2) speed of the shaft on which the gear is mounted
(3) gear type (straight vs. helical, for example).
(4) gear position in the gear train. (Input and output gears have one effect on the A and B variables; gears intermediate to the input and output gears have another effect on these variables.)

For each harmonic of vibration in a given gear, the effect of a particular subvariable is determined by experiments wherein the three non-tested subvariables are held constant and the subvariable in question is varied. After experimenting with each subvariable, the experimental data for each subvariable is subjected to regression analysis and a weight is then assigned to the subvariable. The subvariables are then combined to derive the appropriate A or B value for the harmonic of gear vibration under study.

The N value for the transmission is determined as follows:

(a) Transmission gearbox vibration data are taken for every shift position of the transmission (i.e. first, second reverse, etc.)

(b) The data for each shift position is time series averaged. There is one time series average for each gearshaft active (i.e. involved in the transfer of power) in the shift position. Each time series average is synchronized with the speed of the corresponding active gearshaft. More details of the time series averaging method are discussed later with respect to FIGS. 3 and 4.

(c) For each time series average, a root mean square is calculated for the data points making up the time series average.

(d) The root mean square values are then averaged. The result is N.

Using the T parameter, acceptability of the gear is determined by comparing the calculated T to accept-/reject levels which have been experimentally determined.

GENERAL DESCRIPTION OF GEAR DEFECTS PRODUCING GEAR FAILURE

Figure 1:
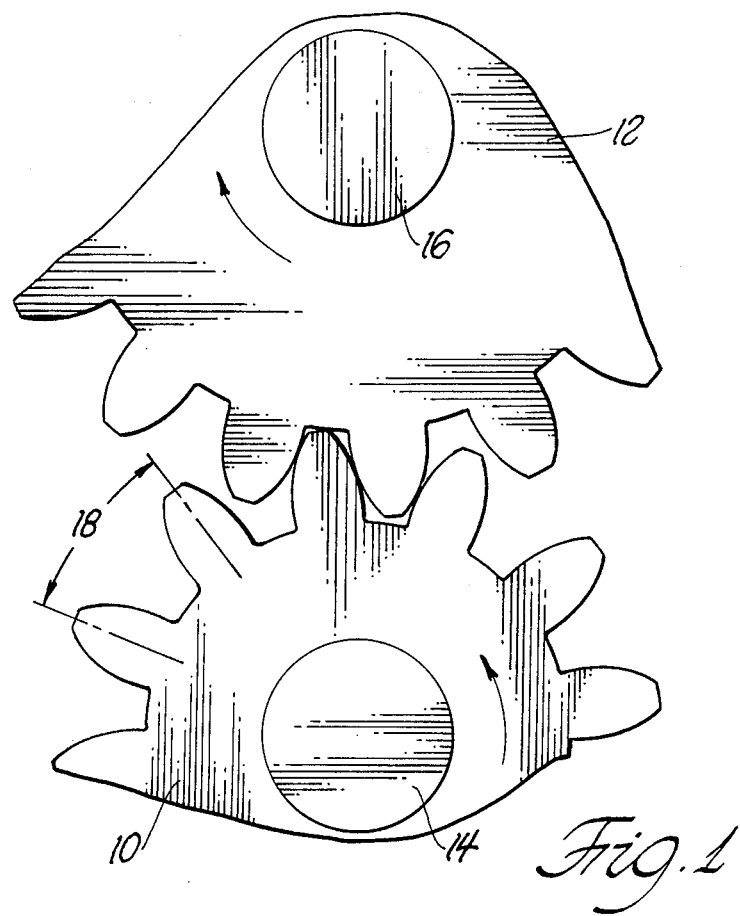
FIG. 1 is a fragmentary view of two meshed spur gears, illustrating the type of gear system that can be non-destructively tested under our invention.

FIG. 1 fragmentarily shows a gear pair of the type with which our invention is concerned. Each spur gear 10 or 12 is freely supported on a rotary shaft 14 or 16. Each gear is clutched to the associated support shaft via a non-illustrated synchronizer that is slidably keyed to the shaft. The gear tooth surfaces are designed to successively mesh smoothly together as one gear drives the other gear. However, defects can occur or develop in the gear system to interfere with the desired smooth mesh action; the defective meshing action causes the meshed gears and associated support shafts to vibrate excessively. Our invention relates to a mechanism for sensing the excessive vibrations, to thereby detect the defective condition before complete gear failure and/or damage to associated mechanisms within the gear housing.

Perhaps the most common gear defect that can occur is irregularity or variation in the gear tooth spacing, denoted by numeral 18 in the drawing. An excessively large tooth spacing can produce a low loading on one tooth and a high loading on the next tooth, i.e. an unequal sharing of the load. An excessively small tooth spacing can produce a "thick tooth" condition, resulting in high contact pressures high frictional wear rates (as the meshing surfaces slide on one another), and tooth interference.

High tooth contact pressures tend to produce gear tooth deflections (bending), and/or shearing of the tooth material. Additional undesired consequences are pitting or spalling of the gear tooth surfaces; in some cases the particulates produced by this action can act as a grinding compound to further aggravate the wear rate.

Usually gear tooth wear is not uniform along the tooth surface. The surface area near the pitch circle usually wears less because there is less sliding at that area. Over time the non-uniform wear rate tends to change the tooth profile (contour), such that impact loads tend to become more concentrated.

The aforementioned tooth irregularity may sometimes produce velocity changes in the drive and driven gears, causing momentary dynamic overloads and possibly tooth chattering. The effect may be influenced by variations in the shaft speeds and/or shaft acceleration-deceleration forces.

Other factors contributing to gear failure are shaft-gear eccentricity, shaft-to-shaft spacing errors and shaft-to-shaft non-parallelism effects. During a teeth mesh event the gear teeth may then impact sooner or later than desired, with negative consequences as regards loading and wear. In certain cases the depth of gear tooth engagement is adversely affected. When the shafts are non-parallel the gear tooth surfaces tend to have point contact near end faces of the gears, rather than the desired line contact across the gear faces; loads tend to be more concentrated.

Gear tooth degradation (or defective manufacture) will usually show up as gear vibrations. However, the tooth degradation may not always proceed uniformly around the gear circumference. Often some of the teeth will degrade only slightly while other teeth degrade to a greater degree. Therefore the amplitude of the vibrational motion may vary from one pulse (tooth mesh event) to the next.

Another factor tending to vary the amplitude of gear-induced vibration is the fact that any given tooth on a drive gear does not engage the same tooth on the driven gear during succeeding gear revolutions. For example, if the drive gear has twelve teeth and the driven gear has sixteen teeth, a given tooth-to-tooth engagement will reoccur only once every one hundred nintey two gear revolutions (i.e. $12 \times 16$).

Another complicating factor results from the fact that various additional vibrations are often present, e.g. vibrations resulting from torsional effects in the shaft-gear-system, vibrations associated with ball bearing motions, and harmonic vibrations (multiple frequencies) of the vibrations of interest. In some cases tooth-to-tooth engagements produce flexural tooth motions, causing plural vibrations for each tooth-to-tooth engagement.

Our invention is especially applicable to automotive vehicle gearing, e.g. gear type transmissions and transfer gear systems (power apportionment to front and rear wheels). We propose to use a non-contact vibrational sensor to detect vibrations induced in the gear case by the vibrating gear pairs. The vibration-detection function is preferably carried out by a laser beam vibration sensor without disassembling the gear system; the vibration sensor is positioned outside the gear case, with the laser beam targeted on the gear case structure.

The gear system is located on a test stand, and run at various speeds representative of road conditions. In the case of an automotive transmission the speed ratio selector is adjusted to different ratio settings, to produce selective meshing of the gear pairs associated with the different speed ratios. Some features of our invention are disclosed in a published paper by the Society of Automotive Engineers on Feb. 23, 1987 entitled "Laser Vibrations Depot Inspection of Gear Boxes", SAE paper No. 870400.

FIG. 7 TEST SYSTEM

FIG. 7 schematically illustrates a testing system embodying our invention. A conventional automotive transmission 32 is located on a test stand between a motor 34 and load 36. An input shaft 38 has a gear 40 in mesh with a second gear 42 affixed to a countershaft 44. Gears 45 and 46 on shaft 44 mesh with gears 47 and 48 on output shaft 50. Depending on the positions of shift collars 52 and 53, gear 45 will transmit a drive force to gear 47, or gear 46 will transmit a drive force to gear 48.

A tachometer 54 senses the rotational speed of input shaft 38. A second tachometer 56 senses the rotational speed of output shaft 50. The signal generated by tachometer 54 is utilized when it is desired to ascertain the condition of gears 40, 42, 45 and 46. The signal generated by tachometer 56 is utilized when it is desired to ascertain the condition of gears 47 and 48. In the case of gears 42, 45 and 46 the timing signal is the tach 54 signal multiplied by the ratio of tooth complements on gears 40 and 42.

Vibrations generated by the meshed gears (under load) are transmitted to gear case 57. A laser-type sensor 59 is targeted onto the gear case to sense, and measure, the vibrational motion. In a typical situation the sensor is positioned about nineteen inches from the gear case so that the laser beam impinges on a flat surface located approximately at a mid point on the gear case. The sensor is preferably oriented so that the laser beam is parallel to the motion direction of the gear case (determined by the way in which the gear case is mounted, and the plane of the gear mesh engagement). Sensor 59 can be constructed in the manner described in U.S. Pat. No. 4,123,166 issued to S. Botcherby et al on Oct. 31, 1978. A suitable laser-type sensor is available from TSI Incorporated located at 500 Cardigan Road, St. Paul, Minn.

It is believed that other types of sensors can be used in lieu of sensor 59, e.g. an accelerometer, or velocimeter, or displacement probe.

Vibration sensor 59 delivers an analog signal to time series averaging circuitry 65 via line 66. Tachometers 54 and 56 deliver speed signals to a tachometer signal select circuit 62. A selected speed signal is applied to time series averaging circuitry 65 through a line 63.

WAVEFORMS (FIGS. 2-6)

Figure 2:
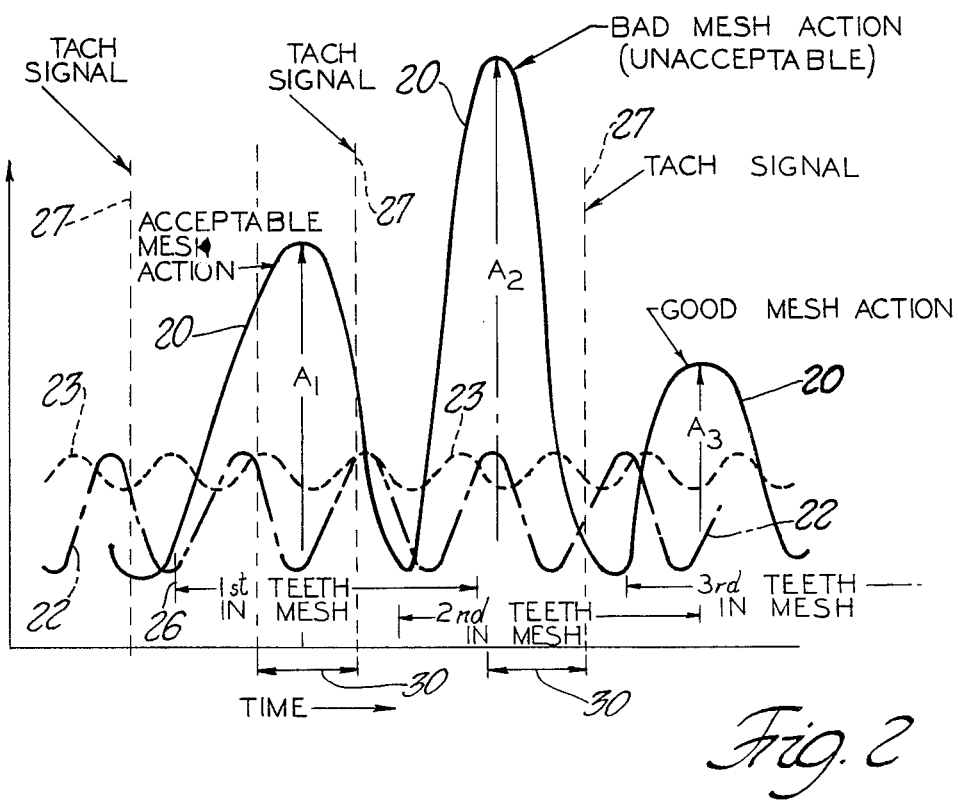
FIGS. 2 through 6 illustrate wave shapes associated with meshing of the gears illustrated in FIG. 1.
Figure 3:
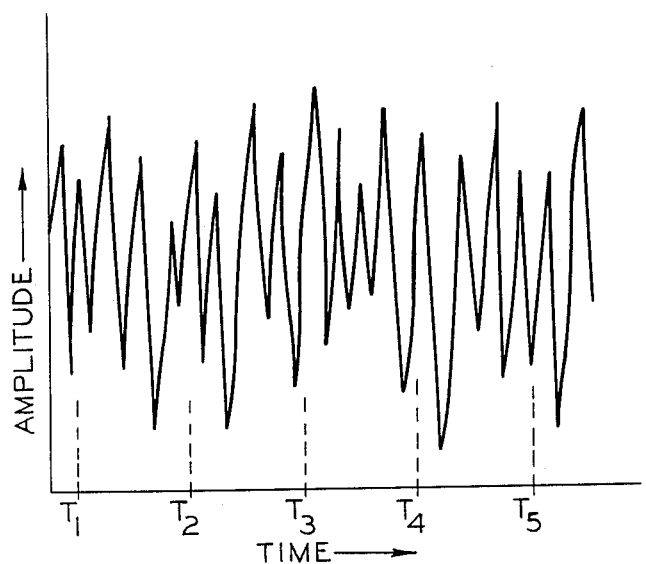

FIG. 3 illustrates generally the type of signal delivered by sensor 59 to time series averaging circuitry 65. FIG. 2 illustrates to an enlarged scale some of the wave components contained within the FIG. 3 waveform. In FIG. 2 a particular waveform (gear vibration) is denoted by numeral 20. Other waves associated with bearing vibration and other phenomena are denoted by numerals 22 and 23; our interest is in wave 20 associated with gear vibration. Wave 20 experiences peaks and valleys, time-spaced in accordance with meshed teeth engagements. The point at which two gear teeth begin to mesh is denoted in the drawing by numeral 26. In most cases successive meshing actions overlap timewise. Each wave segment (in wave 20) is shown as having a peak point about midway along the gear teeth mesh event; however the exact location of each vibrational peak may occur sooner or later during the course of the gear teeth mesh event, depending on the location of the gear tooth defect, e.g. near the root or near the addendum area of the tooth.

FIG. 2 illustrates only some of the vibrational motions taking place during gear system performance, i.e. vibrations associated with the action of one drive gear on its driven gear. Other vibrations of various (different) frequencies are generated by other gear-mesh actions on different shafts in the system. The vibration signal measured instantaneously by the vibration-responsive sensor 59 (FIG. 7) is a resultant signal representing the summation of many individual vibrational forces acting primarily in two directions, i.e. toward the sensor or away from the sensor in FIG. 7.

FIG. 3 illustrates on a reduced scale the resultant signal that might be generated by the gear case. Sensor 59 records this wave pattern (not an isolated signal generated solely by a given gear mesh action).

The analog signal shown in FIG. 3 is not useful by itself, since it contains many component wave elements blended together. To remove wave components which are of no interest it is desirable to reconstruct the analog signal to take out unwanted frequencies. A tachometer-triggered control signal is used to acquire and digitize the analog signal. $T_1$, $T_2$, $T_3$ etc. are curve sampling times spaced in accordance with antialias data sampling techniques.

The term "aliasing" references the fact that if a mixed (multiple) frequency signal is sampled too infrequently at least some of the sampled values may represent points on an unwanted waveform, rather than the waveform of interest. These "unwanted" frequencies are often termed aliased frequencies. The fundamental frequency at which "aliasing" is avoided, or overcome, is at least twice the highest frequency being evaluated.

In FIG. 3 the time intervals between each pulse T and the next pulse T is nominally the reciprocal of 2f ($\frac{1}{2}$ f), where f equals the highest gear mesh frequency being evaluated. In practice the sampling frequency may be 2.56 f (rather than 2 f) in order to permit use of the data in fast fourier transform (FFT) analysis.

By taking a large number of such pulse measurements over many revolutions (e.g., two hundred sampled revolutions) and averaging the corresponding points for each revolution, we can develop a signal containing vibrational elements associated only with the components on the shaft providing the synchronizing pulses. Vibrations at frequencies not synchronized to gear shaft frequency are largely removed from the picture, leaving only the shaft - related frequency.

Figure 4:
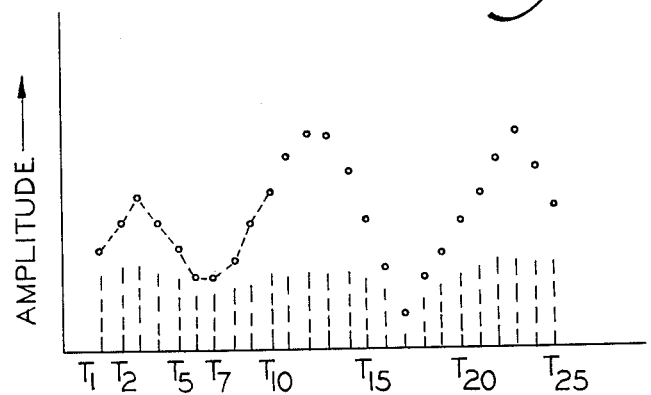

FIG. 4 illustrates one possible curve derived from the analog signal pulses obtained at times $T_1$, $T_2$, $T_3$ etc. The FIG. 4 curve is designated as the time series averaged signal, synchronized to the relevant gear shaft speed.

The instantaneous surface velocity values making up the FIG. 4 signal are resultant average signals related to gear case motion at particular points in time (i.e. at the same point during each revolution of the gear under study). The FIG. 4 signal values are total signal values representing the cumulative inputs of all vibrational forces from the components on the shaft providing the synchronizing signal. The time series averaging process causes signals (vibrational forces) associated with the particular gear shaft action to add constructively, and unrelated signals to cancel.

The digital signal (waveform) of FIG. 4 may be passed through a bandpass filter whose frequency response is related to the gear mesh frequency for the gear being evaluated. For example, if the gear being investigated has twelve teeth, and the gear is rotating at tweleve hundred revolutions per minute (20 revs, per sec.) the frequency response of the filter will be 240 hertz (i.e. 12×20) for the first harmonic of the associated gear vibration. The FIG. 4 waveform can then be band pass filtered at higher frequencies for the second, third and higher harmonics of the associated gear vibration.

Figure 5:
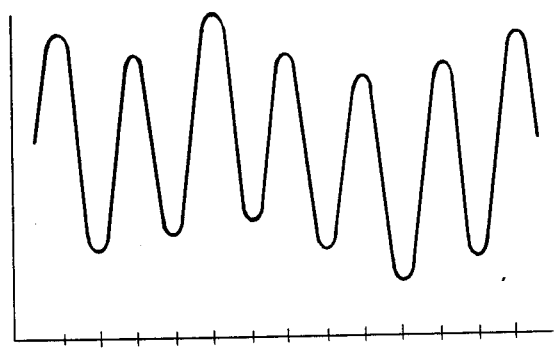

After passage through the bandpass filter the waveform for each harmonic will take approximately the form shown in FIG. 5. The waveform will include a number of regularly-spaced peaks corresponding to the number of teeth on the gear under study; after the number of peaks equals the number of gear teeth the wave pattern will start to repeat.

The FIG. 5 signal is a statistical average of the corresponding surface velocity measurements taken during each shaft revolution over the time span used to produce the FIG. 4 waveform, which has been digitally filtered at the chosen harmonic of the gear mesh frequency. By sampling the surface vibration measurements at 2.56 times the largest gear mesh frequency (as previously noted), and averaging the shaft position synchronized measurements over many shaft revolutions, it is possible to form a picture of gear case motion at each harmonic synchronized to the components of the shaft providing the synchronizing signal.

Any given sample will include the signal of interest plus over signals of no interest. However, by taking a large number of samples the instantaneous values of extraneous frequency signals will largely be cancelled out, since these extraneous signals compete with one another to different extents from sample to sample. Isolation of the vibration associated with the gear being evaluated is then achieved by digitally filtering the shaft synchronized time series averaged signal at the gear mesh frequency.

The FIG. 5 signal represents a given harmonic of the gear case motion (attributable to gear mesh action) toward and away from vibration sensor 59 (FIG. 7). For example, the peak values may be directly related to the limits of motion toward sensor 59, while the valley values may be directly related to the limits of motion away from sensor 59. If the gear system were a perfectly operating system there would be peaks and valleys of equal size. The curve peaks and valleys would be connected by two parallel straight horizontal lines.

The amplitude of the signal (between the peaks and valleys) represents gear case motion; the higher the amplitude the less efficient is the gear system.

The FIG. 5 signal may be rectified to obtain information on gear mesh-caused vibration.

Figure 6:
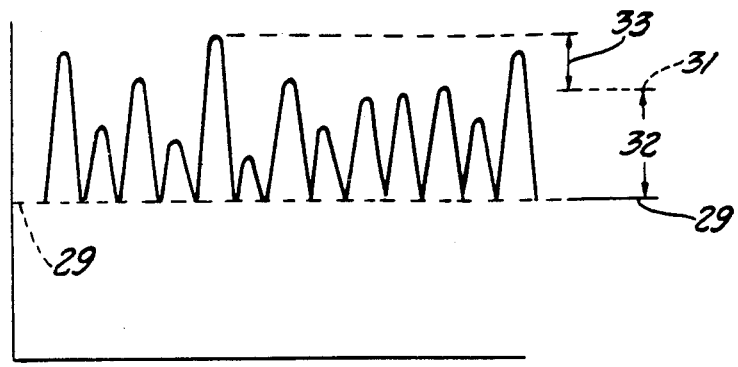

FIG. 6 is the FIG. 5 signal after passage thereof through a rectifier. The rectifier zero axis (or baseline) 29 is set to coincide with the at-rest condition of sensor 59 prior to operation of the gear system.

The peak average value 31 represents the average deflection of the gear case attributable to gear mesh action at the frequency of interest. The spacing 32 of the peak average above zero baseline 29 corresponds to the particular $U_B$ quantity for a given harmonic in equation (1) set forth earlier.

Another parameter of interest is the variation in the peak values; in FIG. 6 numeral 33 represents the peak value $X_i$ variation. The quantity $$\sqrt{\sum_{i=1}^{n} \frac{(x_i - U_B)^2}{n-1}}$$

corresponds to the particular $S_B$ value for each harmonic in equation (1). In this expression $x_i$ equals the signal peak values, and n equals the number of peaks.

For each harmonic studied, the quantity $U_B$ may be viewed as the average gear mesh quality, whereas the quantity $S_B$ may be viewed as the variation in quality (from one gear tooth to another). The present invention is aimed at obtaining an acceptability parameter T that takes into account both the average gear mesh quality and deviations (abnormalities) from the average.

FIG. 7 shows in block form one system designed to accomplish the purposes of the invention. In FIG. 7 the time series averaging circuitry 65 produces a signal in output line 67 that is similar to the signal shown in FIG. 4. Bandpass filter 68 produces a signal in line 70 that is similar to the signal shown in FIG. 5. The signal in line 70 is rectified at block 69 and then passes through line 71 to calculating circuitry 74. Calculating circuitry 74 includes comparator means and averaging means that provide signals in output line 75 representative of signal values 32 and 33 (FIG. 6).

The normalization factor N (equation 1) is an average value for the shaft speed synchronized time series averaged data. The normalization factor N is computed for each gear box tested. A signal from the time series average circuitry 65 may be applied through line 77 to cause the appropriate normalization factor N to be delivered to calculating circuitry 79. Circuitry 79 performs the multiplication, division and addition functions specified in equation (1), to thereby calculate the T value.

We wish it to be understood that we do not desire to be limited to the exact details of construction shown and described for obvious modifications will occur to a person skilled in the art, without departing from the spirit and scope of the appended claims.

We claim:

1. A method of determining the acceptability of a first gear in a set of rotatable gears within a case of a given automotive transmission, the first gear being meshed with a second gear in the set, the method comprising:
   (a) producing a synchronizer signal once per a period corresponding to one or more complete revolutions of the first gear;
   (b) using a vibration sensor to output an analog electrical signal corresponding to vibrations of the gear case, the sensor generating an analog signal for a plurality of said periods;
   (c) averaging together the analog signals from the periods to form a composite signal whose duration is a single period and whose form is that of a wave having peaks and valleys;
   (d) selecting points within the single period and then determining absolute values of the amplitude of the composite signal at the selected points, and then calculating the root mean square of the selected absolute values;
   (e) repeating steps a) through d) for each gear in the set of rotatable gears, and then averaging the root mean squares found for each repetition of these steps, thereby deriving a normalization factor for the given transmission;
   (f) band pass filtering the composite signal to obtain a plurality of component signals corresponding to the first, second and one or more subsequent harmonics of the composite signal, the components signals having a wave form with evenly spaced peaks and valleys disposed along a reference line;
   (g) for each component signal, determining the individual absolute values of the amplitude of peaks or valleys and then ascertaining the average value for the absolute values so determined;
   (h) for each component signal, determining the the statistical standard deviation for the amount by which the absolute values deviate from the average value;
   (i) for each component signal, deriving a first and second weighting factor, each weighting factor based upon the harmonic of the component signal, the gear ratio between the first and second gears, the rotational speed of a gear shaft upon which the first gear is mounted, the gear type of the first gear, and the position of the first gear relative to others gears in the gear train;

(j) using the average values for the absolute values derived in step g, the statistical standard deviations from step h, the normalization factor from step e, and the weighting factors from step i to calculate a first fault characterization parameter;

(k) comparing the first fault characterization parameter to a selected fault characterization parameter for gears similar to the first gear in transmission similar to the given transmission.

2. A gear evaluation system comprising means for producing a first electrical input signal representing gear rotational speed; means for producing a second input signal representing gear case surface velocity caused at least partly by gear tooth mesh action; time series averaging means for receiving the input signals and creating therefrom a first output signal synchronized to shaft speed of a shaft rotating the gear; means for receiving the first output signal and segregating therefrom a plurality of wave-like signals having alternated peaks and valleys and having frequencies which are integral multiples of gear mesh frequency for the gear, the wave-like signals being at least mainly determined by the gear case surface velocity caused by meshing action of the gear; signal processing means for recording the wave-like signals, determining individual amplitudes of the peaks of the wave-like signals, averaging the amplitudes, and determining average deviation of the individual amplitudes from an averaged amplitude, assigning empirical weighting factors to averaged amplitudes and to average deviations, and then summing together numerical values of averaged amplitudes with numerical values of average deviations.

3. The system of claim 2 wherein the time series averaging means includes a means for sampling a second input signal at a frequency that is at least twice the gear mesh frequency for the gear.

4. The system of claim 3 wherein the step of determining individual amplitudes of the peaks in the wave-like signals is comprised of full wave rectification of the wave-like signals and then determination of the amplitude values of resultant wave-like signals caused by the full wave rectification.

* * * * *